US011767879B2

(12) United States Patent
Verbrugge

(10) Patent No.: US 11,767,879 B2
(45) Date of Patent: Sep. 26, 2023

(54) BEARING HOUSING DESIGN WITH DUAL O-RING FUNCTION

(71) Applicant: AGCO International GmbH, Duluth, GA (US)

(72) Inventor: Wilko Verbrugge, Boekel (NL)

(73) Assignee: AGCO International GmbH, Neuhausen (CH)

( * ) Notice: Subject to any disclaimer, the term of this patent is extended or adjusted under 35 U.S.C. 154(b) by 1240 days.

(21) Appl. No.: 16/229,988

(22) Filed: Dec. 21, 2018

(65) Prior Publication Data
US 2020/0200220 A1 Jun. 25, 2020

(51) Int. Cl.
*F16C 11/06* (2006.01)
*B60G 7/00* (2006.01)

(52) U.S. Cl.
CPC .......... *F16C 11/0666* (2013.01); *B60G 7/005* (2013.01); *F16C 2310/00* (2013.01); *Y10T 403/32729* (2015.01)

(58) Field of Classification Search
CPC ............. B60G 7/005; B60G 2204/416; F16C 11/0609; F16C 11/0642; F16C 11/0666; F16C 11/0671; F16C 11/0676; F16C 11/068; F16C 11/0695; F16C 11/0647; F16C 11/0604; F16C 2310/00; Y10T 403/32704; Y10T 403/32681; Y10T 403/32729; Y10T 403/31; Y10T 403/315
See application file for complete search history.

(56) References Cited

U.S. PATENT DOCUMENTS

| | | | | |
|---|---|---|---|---|
| 6,357,956 B1* | 3/2002 | Zebolsky | ................ | F16J 3/042 277/637 |
| 6,935,803 B2* | 8/2005 | Abels | .................. | F16C 11/0666 403/51 |
| 7,029,399 B2* | 4/2006 | Oki | .......................... | F16J 3/042 277/922 |
| 7,221,265 B2* | 5/2007 | Bjorkgard | ........... | F16C 11/0609 403/114 |
| 7,413,201 B2* | 8/2008 | Freytag | .................... | B60G 3/24 403/27 |
| 7,513,514 B1* | 4/2009 | Schlosser | ............... | B62D 17/00 280/86.756 |
| 7,708,488 B2* | 5/2010 | Kunze | ................. | F16C 11/0609 403/116 |
| 8,708,594 B2* | 4/2014 | Brunneke | .............. | B60G 7/005 403/135 |

(Continued)

FOREIGN PATENT DOCUMENTS

| | | | | |
|---|---|---|---|---|
| CN | 108006060 A | * | 5/2018 | ............. B60G 7/005 |
| DE | 10207779 C1 | * | 10/2003 | ............. B60G 7/005 |

(Continued)

*Primary Examiner* — Josh Skroupa

(57) ABSTRACT

An apparatus includes a housing; a spherical bearing disposed within the housing; a shaft disposed in part beneath the housing and penetrating a portion of the spherical bearing; a bellow circumscribing a lower portion of the housing and providing an interface between the spherical bearing and the shaft; and a cover adjacent a lower end of the bellow and having a circumferential groove configured to enable rotational movement of the bellow, the cover extending to and circumferentially surrounding a portion of the shaft to seal the shaft.

15 Claims, 12 Drawing Sheets

(56) References Cited

U.S. PATENT DOCUMENTS

| | | | | |
|---|---|---|---|---|
| 8,905,417 B2* | 12/2014 | Kuroda | ................. | B60G 7/005 |
| | | | | 280/124.152 |
| 10,173,487 B2* | 1/2019 | von der Haar | ..... | F16C 11/0642 |
| 10,280,971 B2* | 5/2019 | Brunneke | ........... | F16C 11/0666 |
| 10,563,691 B2* | 2/2020 | Hosen | ................. | F16C 11/0671 |
| 2005/0110235 A1* | 5/2005 | LeBlanc | ................ | B60G 11/28 |
| | | | | 280/124.135 |
| 2007/0183841 A1* | 8/2007 | Kunze | ................ | F16C 11/0609 |
| | | | | 403/131 |
| 2009/0154988 A1* | 6/2009 | Kunze | ................ | F16C 11/0609 |
| | | | | 403/114 |
| 2010/0013181 A1* | 1/2010 | Knopp | ................ | F16C 11/0661 |
| | | | | 403/123 |
| 2011/0123259 A1* | 5/2011 | Brunneke | ............. | B60G 7/008 |
| | | | | 403/119 |
| 2014/0294486 A1* | 10/2014 | Staade | .................... | B62D 7/16 |
| | | | | 403/113 |
| 2015/0322999 A1* | 11/2015 | Brunneke | .............. | B60G 7/005 |
| | | | | 403/122 |
| 2015/0328946 A1* | 11/2015 | von der Haar | ......... | F16C 11/06 |
| | | | | 403/76 |
| 2016/0229243 A1* | 8/2016 | Wagner | .................. | F16C 33/74 |
| 2019/0120286 A1* | 4/2019 | Lee | .................... | F16C 11/0604 |

FOREIGN PATENT DOCUMENTS

| | | | | | |
|---|---|---|---|---|---|
| DE | 102008001177 | A1 | * | 10/2009 | ......... F16C 11/0666 |
| DE | 102016113879 | A1 | * | 2/2018 | ......... F16C 11/0671 |
| DE | 102017203687 | A1 | * | 9/2018 | ......... F16C 11/0666 |
| FR | 2964168 | A1 | * | 3/2012 | ......... F16C 11/0671 |
| GB | 1117174 | A | * | 6/1968 | ......... F16C 11/0671 |
| WO | WO-2004083660 | A1 | * | 9/2004 | ......... F16C 11/0666 |
| WO | WO-2005098249 | A1 | * | 10/2005 | ............ B60G 7/005 |

* cited by examiner

BEARING HOUSING DESIGN WITH DUAL O-RING FUNCTION

TECHNICAL FIELD

The present disclosure is generally related to pull-type machines, and, in particular, suspensions for pull-type sprayers.

BACKGROUND

Pull-type sprayers provide a rather economical way to dispense product onto the field and are pulled through the field via coupling to a tractor, a combine harvester, or any other towing vehicle. Pull-type sprayers comprise a chassis on which a spraying apparatus is mounted, with a rigid suspension to which a pair of wheels is mounted. Pull-type sprayers have some challenges to operation, including fluid level accuracy during filling operations or risk of rollover or inconsistent dispensing of product along undulating or uneven terrains. It would be desirable to improve the ability of pull-type trailers to address these and/or other challenges in operation.

SUMMARY OF THE INVENTION

In one embodiment, an apparatus, comprising: a housing; a spherical bearing disposed within the housing; a shaft disposed in part beneath the housing and penetrating a portion of the spherical bearing; a bellow circumscribing a lower portion of the housing and providing an interface between the spherical bearing and the shaft; and a cover adjacent a lower end of the bellow and having a circumferential groove configured to enable rotational movement of the bellow, the cover extending to and circumferentially surrounding a portion of the shaft to seal the shaft.

These and other aspects of the invention will be apparent from and elucidated with reference to the embodiment(s) described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
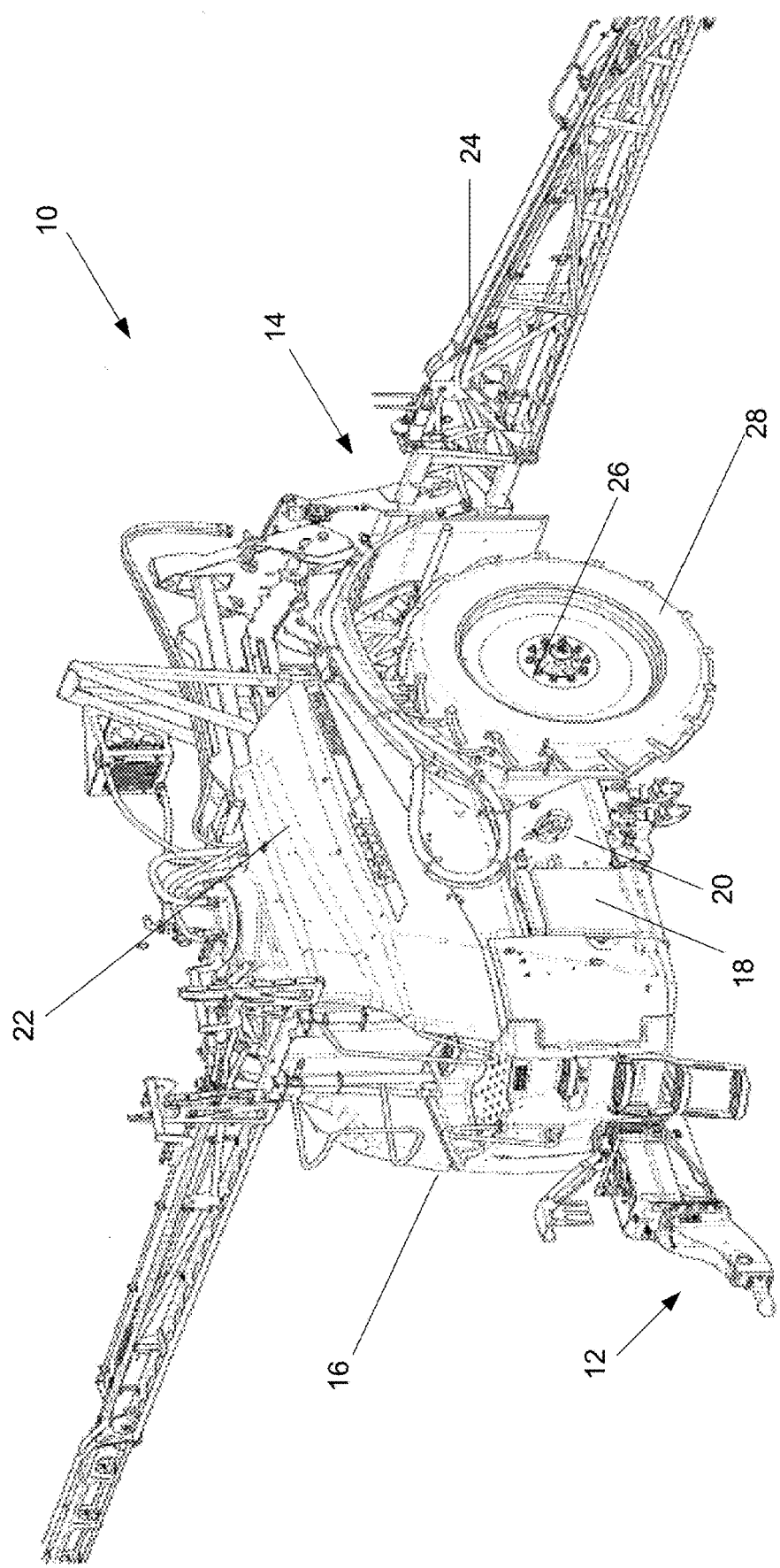
FIG. 1 is a schematic diagram that illustrates, in isometric view, an example pull-type machine in which an embodiment of an independent suspension system is implemented.
Figure 2A:
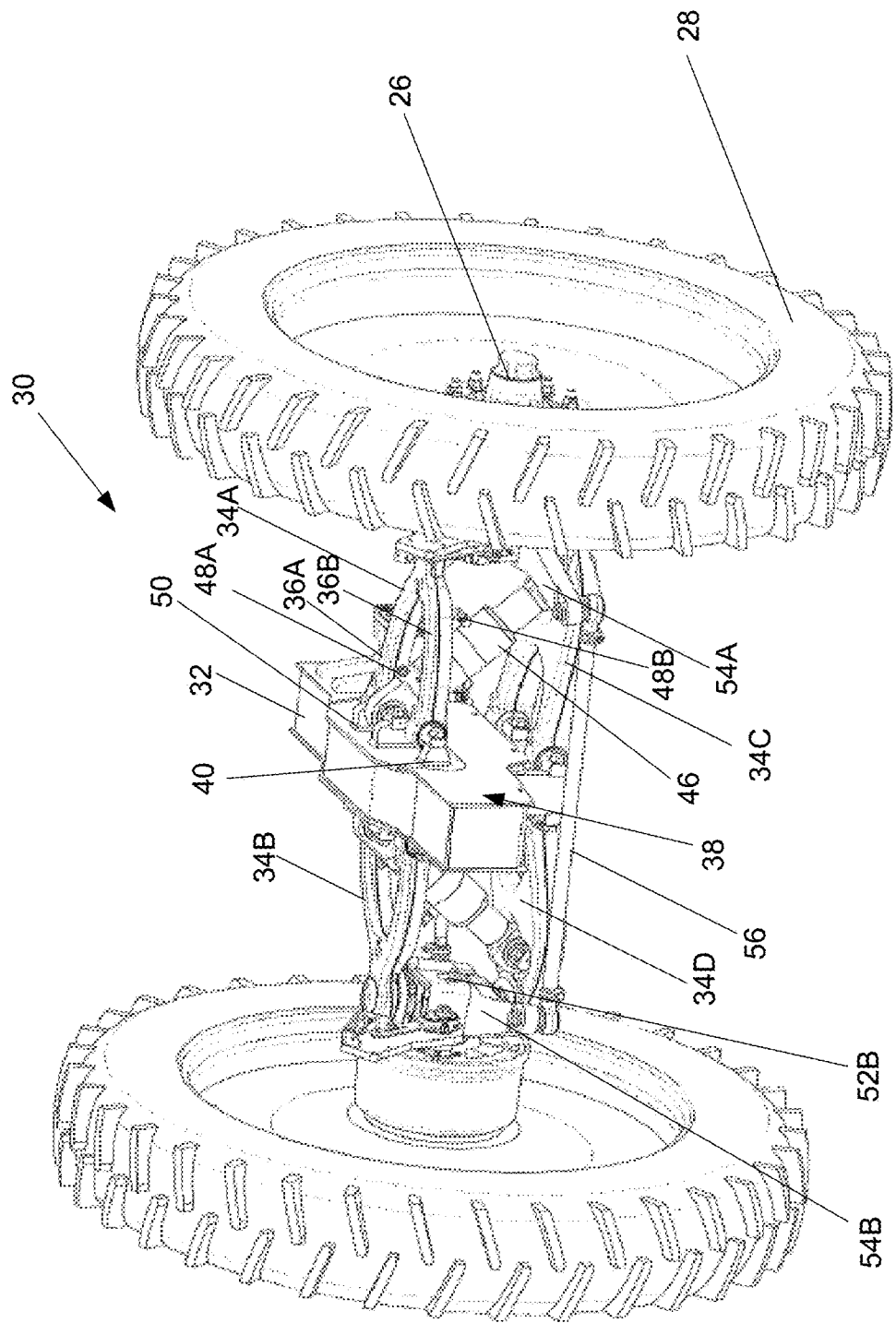
FIGS. 2A-2B are schematic diagrams that illustrate, in fragmentary, front and rear isometric views, respectively, an example axle assembly in which an embodiment of an independent suspension system is implemented.
Figure 2B:
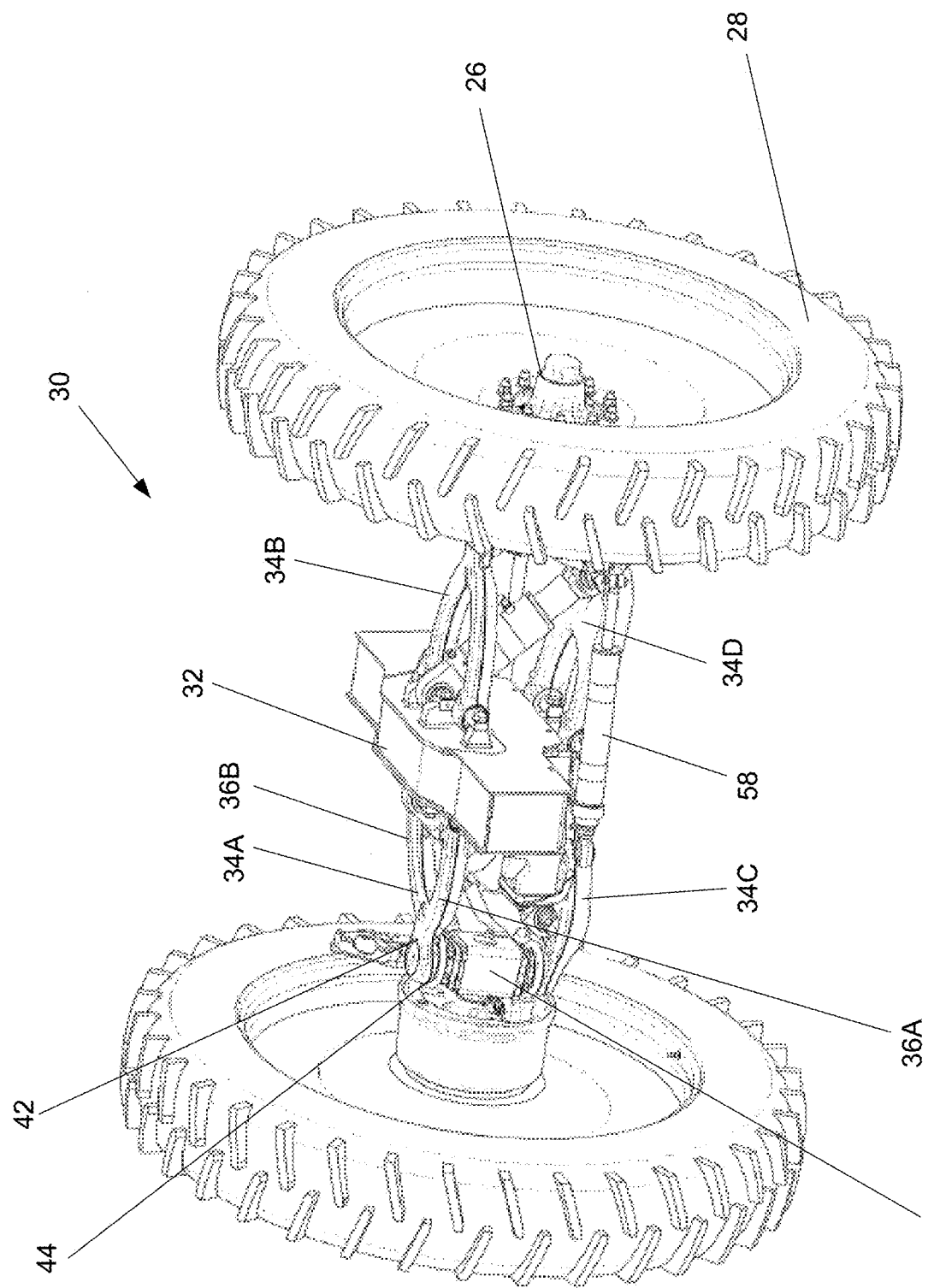
Figure 3A:
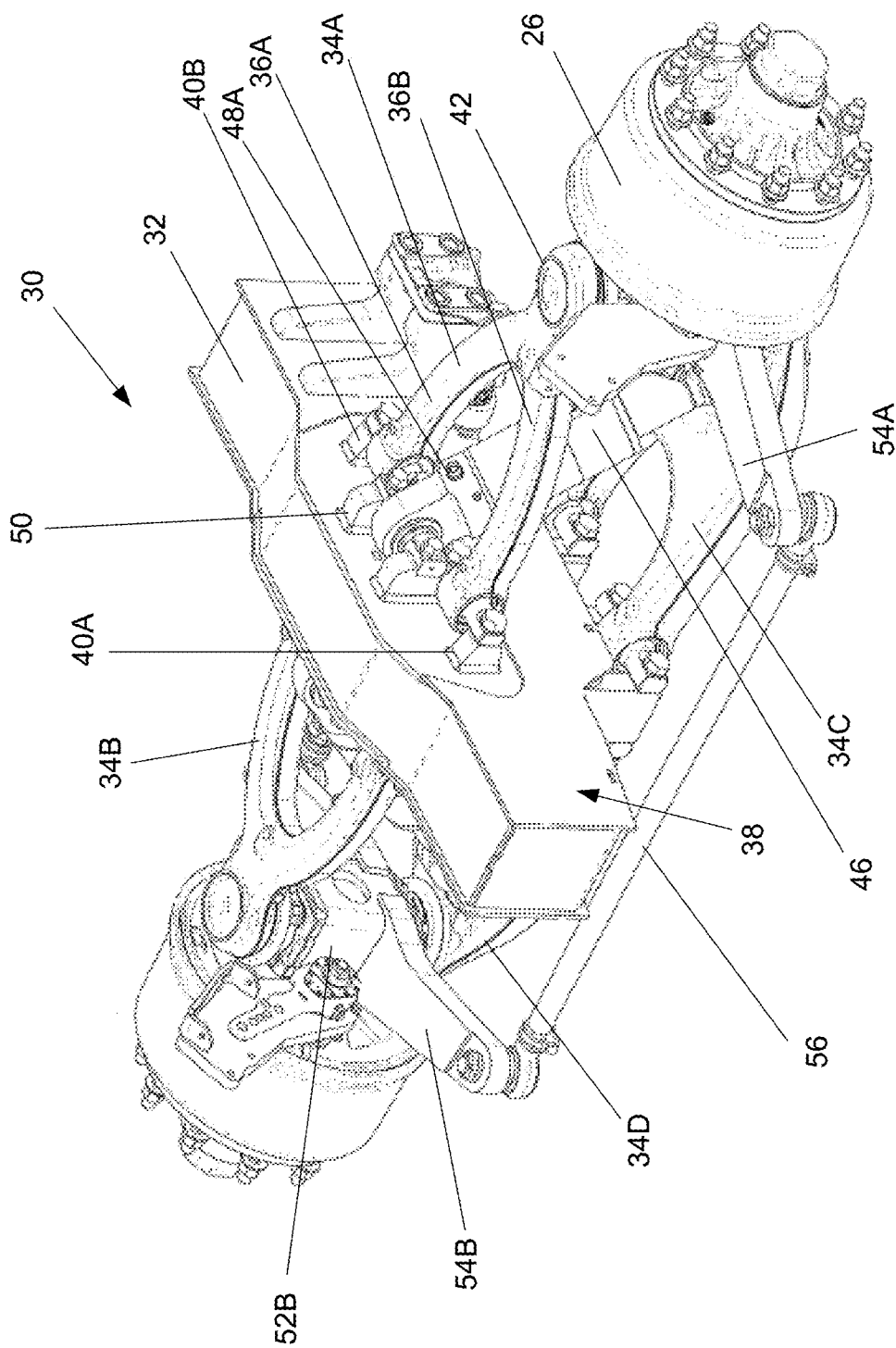
FIGS. 3A-3B are schematic diagrams that further illustrate, in fragmentary, front isometric views, the axle assembly of FIGS. 2A-2B, without the tires.
Figure 3B:
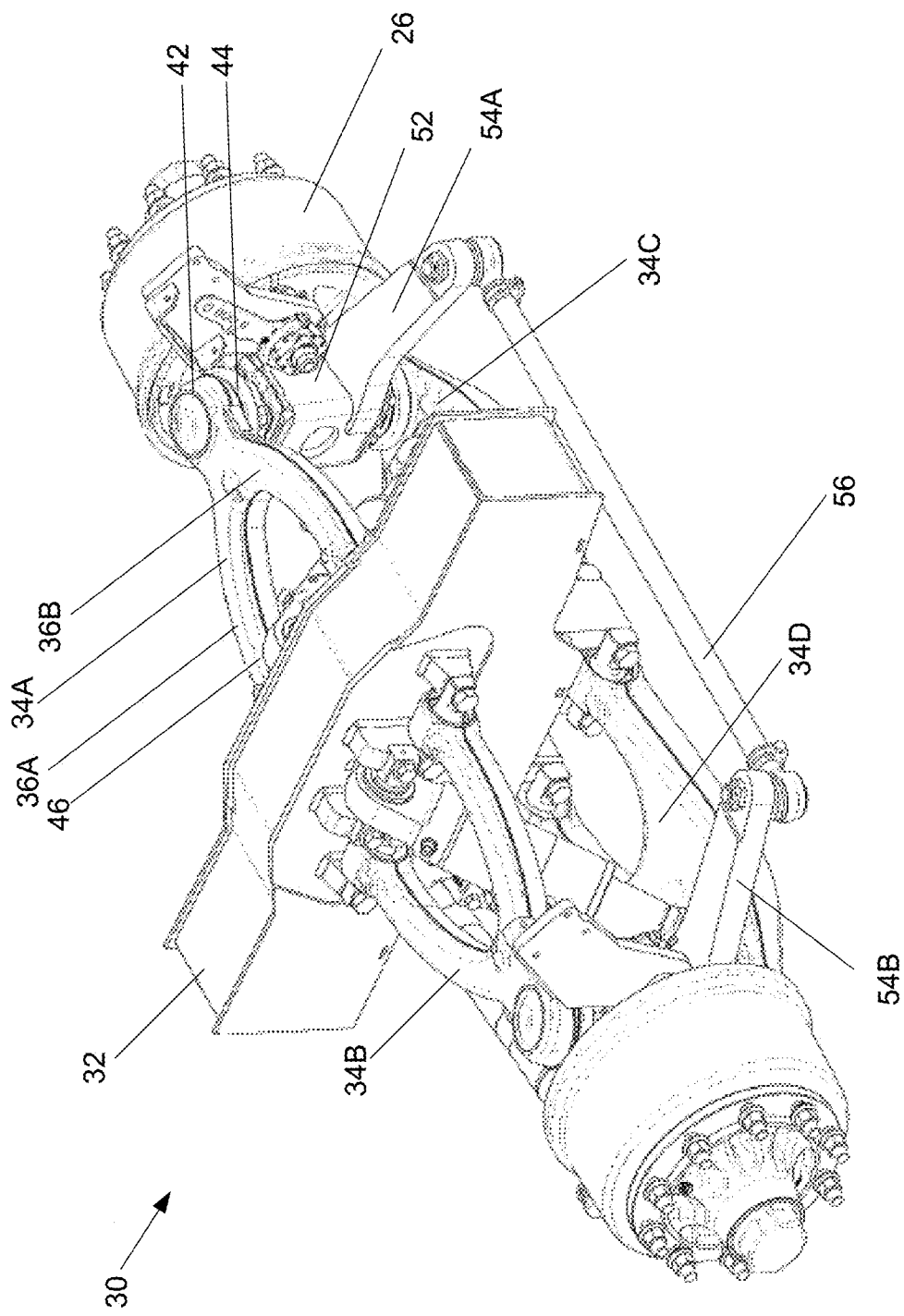
Figure 4A:
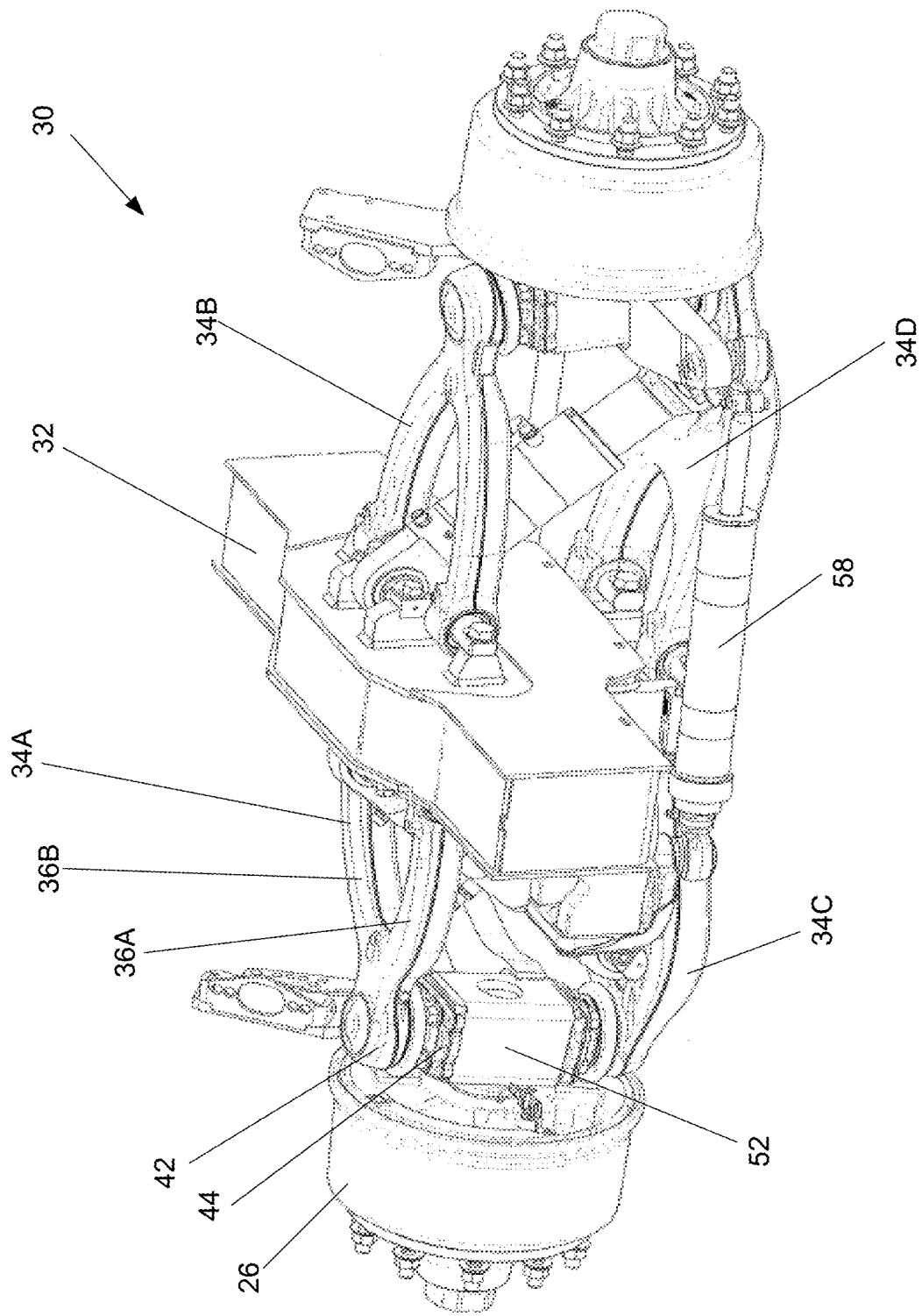
FIGS. 4A-4B are schematic diagram that further illustrate, in fragmentary, rear isometric views, the axle assembly of FIGS. 3A-3B.
Figure 4B:
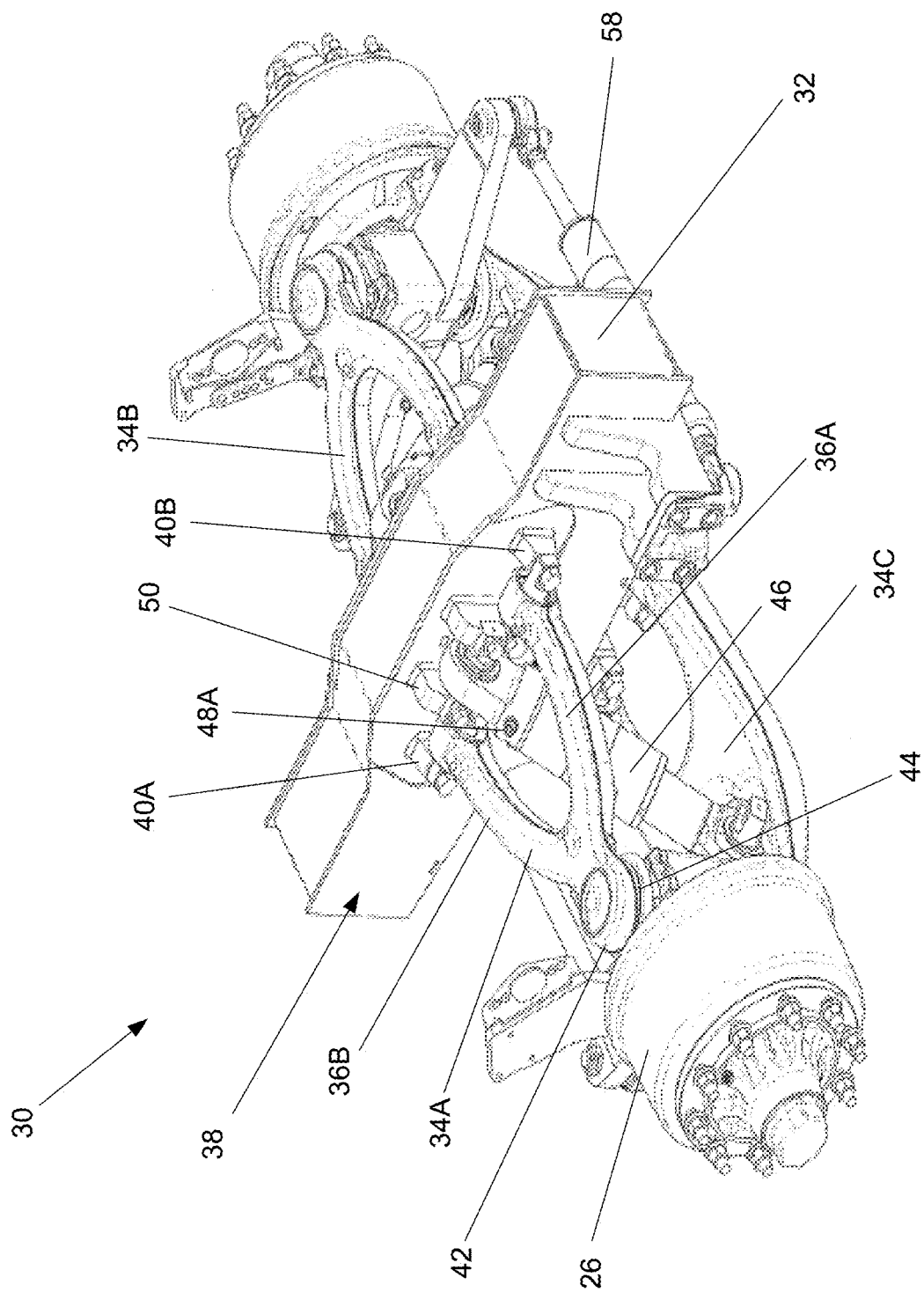

Certain embodiments of an independent suspension system for a pull-type machine are disclosed that improves upon rigid suspension designs, enabling improved handling on different terrain, levelling and height adjustment functions, and robustness in operations of working system payloads. In one embodiment, the independent suspension system is implemented in a pull-type sprayer, which includes a chassis, the fully independent suspension mounted on the chassis, and wheels mounted to the independent suspension. Also disclosed herein are certain embodiments of a kingpin bearing assembly used in the independent suspension system described above that enable the functionality of the independent suspension system.

Digressing briefly, pull-type machines have traditionally used rigid suspension designs, particularly for agricultural equipment, where the core business of the agricultural equipment manufacturer lies in the working systems carried by a conventional, out-sourced underlying carriage. In other words, in the interest of cost controls, agricultural manufacturers invest in design and development of, for instance, the sprayer systems, and typically rely on other original equipment manufacturers to supply the underlying carriage. Accordingly, the rigid suspension designs have been the standard for years for pull-type machines with little interest in the industry, due to cost constraints, in raising the bar for updates to the carriage design. However, as noted above, different terrains and/or field conditions present some challenges to rigid suspension designs. Certain embodiments of an independent suspension system address these and other challenges through its independent functioning on each side of the chassis and through its kingpin bearing design.

Having summarized certain features of an independent suspension system of the present disclosure, reference will now be made in detail to the description of an independent suspension system as illustrated in the drawings. While an independent suspension system will be described in connection with these drawings, there is no intent to limit it to the embodiment or embodiments disclosed herein. For instance, in the description that follows, emphasis is placed on the implementation as a pull-type sprayer, though in some embodiments, pull-type machines for different applications and/or other industries may benefit from the independent suspension system and/or kingpin bearing design, and hence are contemplated to be within the scope of the disclosure. As another example, though emphasis on the description below is on a single axle design, one or more axles may be implemented in some embodiments. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Note also that references hereinafter made to certain directions, such as, for example, "front", "rear", "left" and "right", are made as viewed from the rear of a pull-type machine looking forwardly.

FIG. 1 is a schematic diagram that illustrates, in isometric view, an example pull-type machine 10 in which an embodiment of an independent suspension system is implemented. In the depicted embodiment, the pull-type machine 10 is implemented as a pull-type sprayer. It should be appreciated by one having ordinary skill in the art, in the context of the present disclosure, that the pull-type machine 10 may be embodied as another type of working machine in some embodiments. The pull-type machine 10 comprises a hitch assembly 12 for coupling to a towing vehicle (e.g., tractor, combine, or other towing vehicle, not shown). In some embodiments, the hitch assembly 12 may be replaced with a clevis-type coupling assembly. Electrical wiring and/or tubing (for fluid coupling) may be carried over the hitch assembly 12 from a towing vehicle to enable electronic communications (e.g., via ISOBUS communication protocols, RS-232, etc.) and/or power and fluid communication, respectively between the towing vehicle and the pull-type machine 10. The pull-type machine 10 further comprises a sprayer system 14, the sprayer system 14 comprising suitable plumbing (e.g., pumps, valves, tubing, tanks, nozzles) to store and dispense product (chemical, including fertilizer, herbicides, etc.) onto a field on which the pull-type machine 10 is towed. The sprayer system 14 comprises, fore and aft, among other components, a clean water tank 16 (and platform), a chemical eductor (also referred to herein as an inductor hopper, hopper, eductor) 18, a plumbing system 20 that comprises hoses and/or other fluid transport equipment that fluidly couples the eductor 18 with the clean water tank 16, and a product tank 22. In some implementation, the sprayer system 14 comprises an auxiliary clean water tank (e.g., for increasing volume capacity). The sprayer system 14 further comprises a foldable and, in some embodiments, a height-adjustable boom 24 (shown in an extended, working position) that comprises plural spray nozzles and associated plumbing components (e.g., valves, pumps, tubing, meters, etc.) that enable the dispensing of product onto the field. As the sprayer system 14 comprises conventional components, further discussion of the same is omitted here for brevity.

The pull-type machine 10 further comprises an underlying carriage, that is, a chassis and a suspended axle to which plural (e.g., two, with one shown) wheels 26 having respective tires 28 are mounted thereon, as shown in FIGS. 2A-4B. In particular, and with reference to FIGS. 2A-4B, an axle assembly 30 is shown comprising an embodiment of an independent suspension system. The axle assembly 30 is coupled at least centrally (longitudinally) to a chassis 32 (shown in part, with well-known bracketing, etc. omitted to avoid obfuscating pertinent parts of the design). In one embodiment, the axle assembly 30 comprises plural wishbone members 34, including an upper left wishbone member 34A, an upper right wishbone member 34B, a lower left wishbone member 34C, and a lower right wishbone member 34D. As the name implies, the plural wishbone members 34 are configured in the form or shape of a wishbone. Using the upper left wishbone member 34A as an illustrative example (with similar applicability of description to the other wishbone members 34B-34D), the upper left wishbone 34A comprises a first arm 36A and a second arm 36B that are pivotably coupled to a face 38 of the chassis 32 via a bracket assembly 40 that is secured to the face 38. The opposing ends of the arms 36A, 36B physically merge to an axial mount 42. In one embodiment, the axial mount 42 is round or oval in shape, and is coupled to a top end of an underlying kingpin bearing assembly 44 (or bottom end for the lower wishbone members 34C and 34D), described further below. The arms 36A and 36B straddle a cylinder 46. The cylinder 46 is depicted as a hydraulic cylinder, for which hoses (omitted to avoid obfuscation of the pertinent portions of the design) are used to couple to ports 48 (e.g., 48A, 48B) to enable activation via fluid flow between a control valve (described below) and the cylinder 46. Note that in some embodiments, the cylinder 46 may comprise other types of cylinders, including rotary cylinders and/or cylinders of other designs (e.g., electromagnetic, pneumatic, etc.). The cylinder 46 is pivotably coupled on one end to a bracket assembly 50 secured to the face 38 of the chassis 32, and coupled at the other end to the (lower) wishbone member 34C proximal to an inner portion of the wheel 26. Note that in the depicted embodiment, there are two cylinders 46, one for each side (left and right) of the axle assembly 30, as well as four (4) kingpin bearing assemblies 44 (top and bottom left, top and bottom right), as explained further below.

The axle assembly 30 further comprises stub axles 52 (e.g., 52A, 52B) and steering controls (e.g., 54A, 54B), a steering rod 56, and a steering cylinder 58. The stub axles 52 are sandwiched between respective upper and lower axial mounts 42 that are coupled towards the center to respective kingpin bearing assemblies 44. The steering controls 54 provide for steering functionality. For instance, and as is known, the steering controls 54 are coupled to the steering rod 56 to ensure a uniform turning pattern amongst the wheels 26 (and tires 28), facilitated by actuation of the steering cylinder 58 under the control of the steering controls 54. As steering operations are known to those having ordinary skill in the art, further discussion of the same is omitted for brevity.

Figure 5:
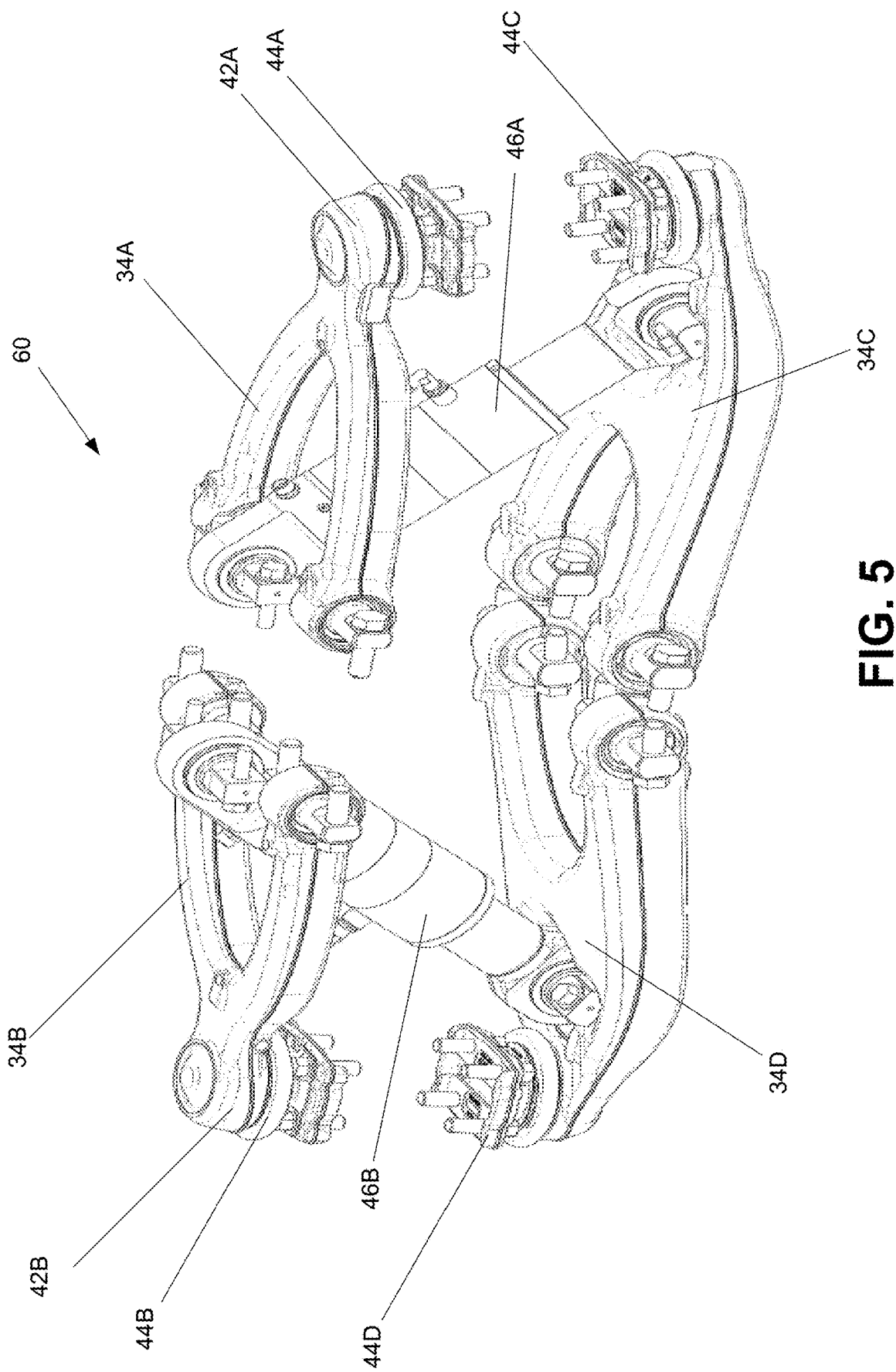
FIG. 5 is a schematic diagram that illustrates, in fragmentary, isometric view, an embodiment of an independent suspension system.

Referring now to FIG. 5, shown in fragmentary view is an embodiment of an independent suspension system 60 of the axle assembly 30 of FIGS. 2A-4B. In one embodiment, the independent suspension system 60 comprises the wishbone members 34 (e.g., upper left 34A, upper right 34B, lower left 34C, lower right 34D), the cylinders 46 (e.g., cylinder 46A associated with the upper left wishbone member 34A and lower left wishbone member 34C, cylinder 46B associated with the upper right wishbone member 34B and lower right wishbone member 34D), and the kingpin bearing assemblies 44 (e.g., 44A associated with the upper left wishbone member 34A, 44B associated with the upper right wishbone member 34B, 44C associated with the lower left wishbone member 34C, 44D associated with the lower right wishbone member 34D). Other components of the axle assembly 30 (e.g., FIGS. 2A-4B) have been omitted. As noted, the wishbone members 34 are coupled to the kingpin bearing assemblies 44 via a respective axial mount 42 (e.g., 42A, 42B on the upper side, and obscured from view on the lower side). Each of the kingpin bearing assemblies 44 comprise plural (e.g., four (4)) bolts (e.g., bolt 62) that are secured on one end (e.g., exposed end in FIG. 5) to the stub axle 52 and on the other end, friction-fitted to a cover as explained further below.

Figure 6:
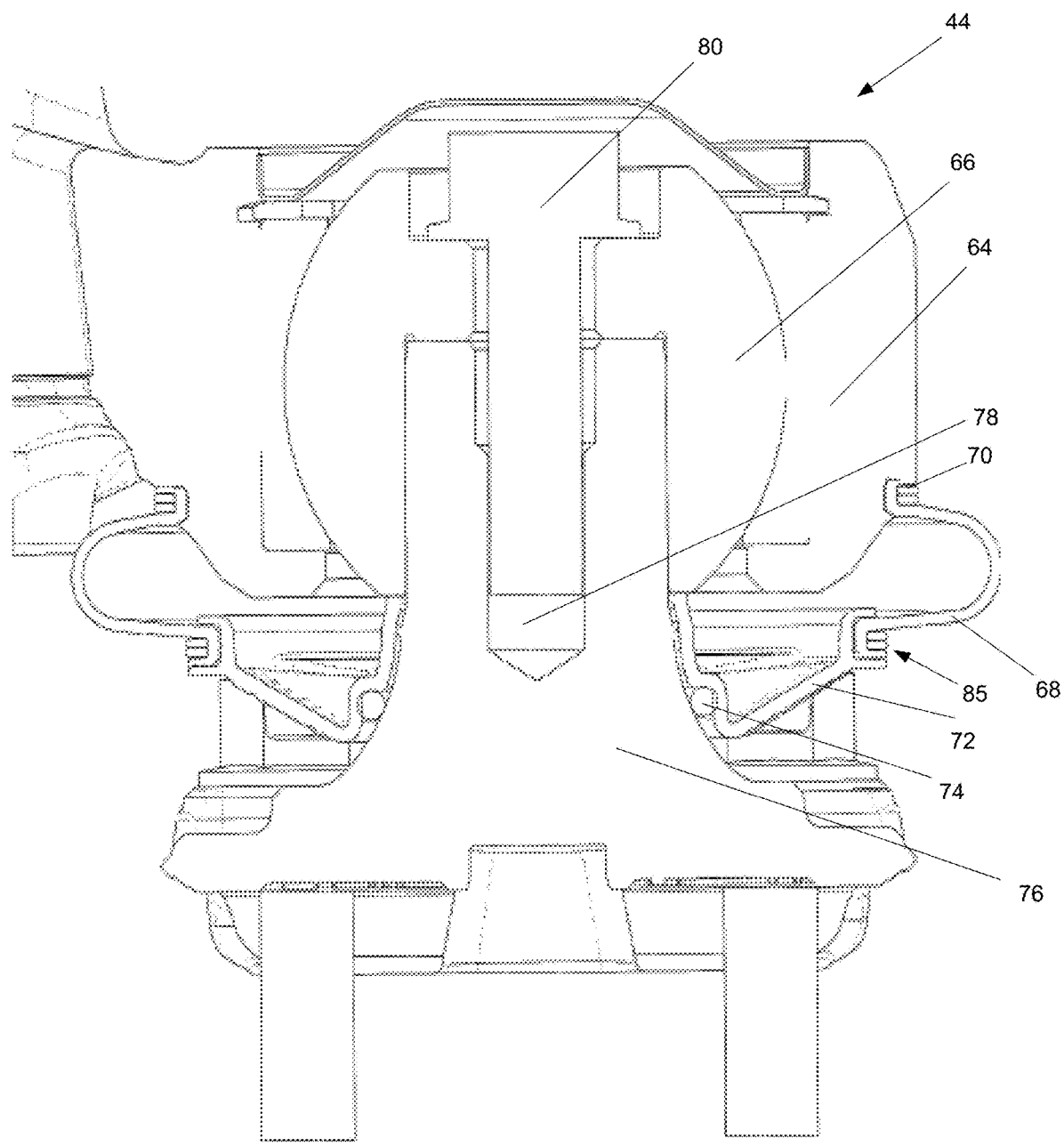
FIG. 6 is a schematic diagram that illustrates, in fragmentary, front elevation, cut-away view, the kingpin bearing assembly of the independent suspension system shown in FIG. 5.

FIG. 6 illustrates in further detail the kingpin bearing assembly 44 of the independent suspension system 60 of FIG. 5. The kingpin bearing assembly 44 comprises a housing 64, a spherical bearing 66 disposed within the housing 64, a bellow 68, a clamping ring 70 circumscribing upper and lower grooves of the bellow 68, a cover 72, an O-ring 74, and a shaft 76. The shaft 76 comprises a recess 78 through which a bolt 80 is disposed and secured. Through tightening of the bolt 80 (e.g., threaded bolt), the spherical bearing 66 is rotationally fixed onto the shaft 76, and the O-ring 74 is deformed as further explained below. That is, the bolt 80 passes centrally through the kingpin bearing assembly 44, through the spherical bearing 66 and the shaft 76. In one embodiment, the spherical bearing 66 is a closed (e.g., dry) bearing that permits angular rotation about a central point in two orthogonal directions. In some embodiments, the spherical bearing 66 may require lubrication.

The bellow 68 is comprised of a resilient material (e.g., rubber), and provides a connection between stationary and moving parts of the kingpin bearing assembly 44. The bellow 68 comprises a dual function. For instance, the bellow 68 absorbs cardanic movement of the spherical bearing 66 and simultaneously passes rotary movement corresponding to the steering function implemented by the steering controls 54 (e.g., see FIG. 2B). In one embodiment, the bellow 68 is coated with a low friction material (e.g., PTFE layer) to reduce friction forces. In some embodiments, the bellow 68 is not coated. The bellow 68 interfaces with the housing 64 on an upper end of the bellow 68 and the cover 72 on the lower end of the bellow 68, the interfaces comprising circumferential, upper and lower grooves above and below an outward protruding surface of the bellow 68, the upper groove of a larger diameter than the lower groove.

Disposed in these upper and lower grooves of the bellow 68 is a clamping ring 70. The clamping ring 70 provides a dual function. In the position of the larger diameter upper groove, the clamping ring 70 performs a clamping function. In the position of the lower groove, the clamping ring 70 performs a supporting function, and not a clamping function. In some embodiments, separate clamping rings may be used.

The O-ring 74 circumscribes the shaft 76. The O-ring 74 is configured to deform when the central bolt 80 is tightened. The deformation gives rise to a dual function of the O-ring 74. For instance, the O-ring 74 performs a sealing function, providing a sealed connection to the shaft 76 to prevent or inhibit the ingress of elements (e.g., water, dust, etc.) from the environment into the bearings. Also, the O-ring 74, when deformed, provides a friction connection between the shaft 76 and the cover 72.

Figure 7:
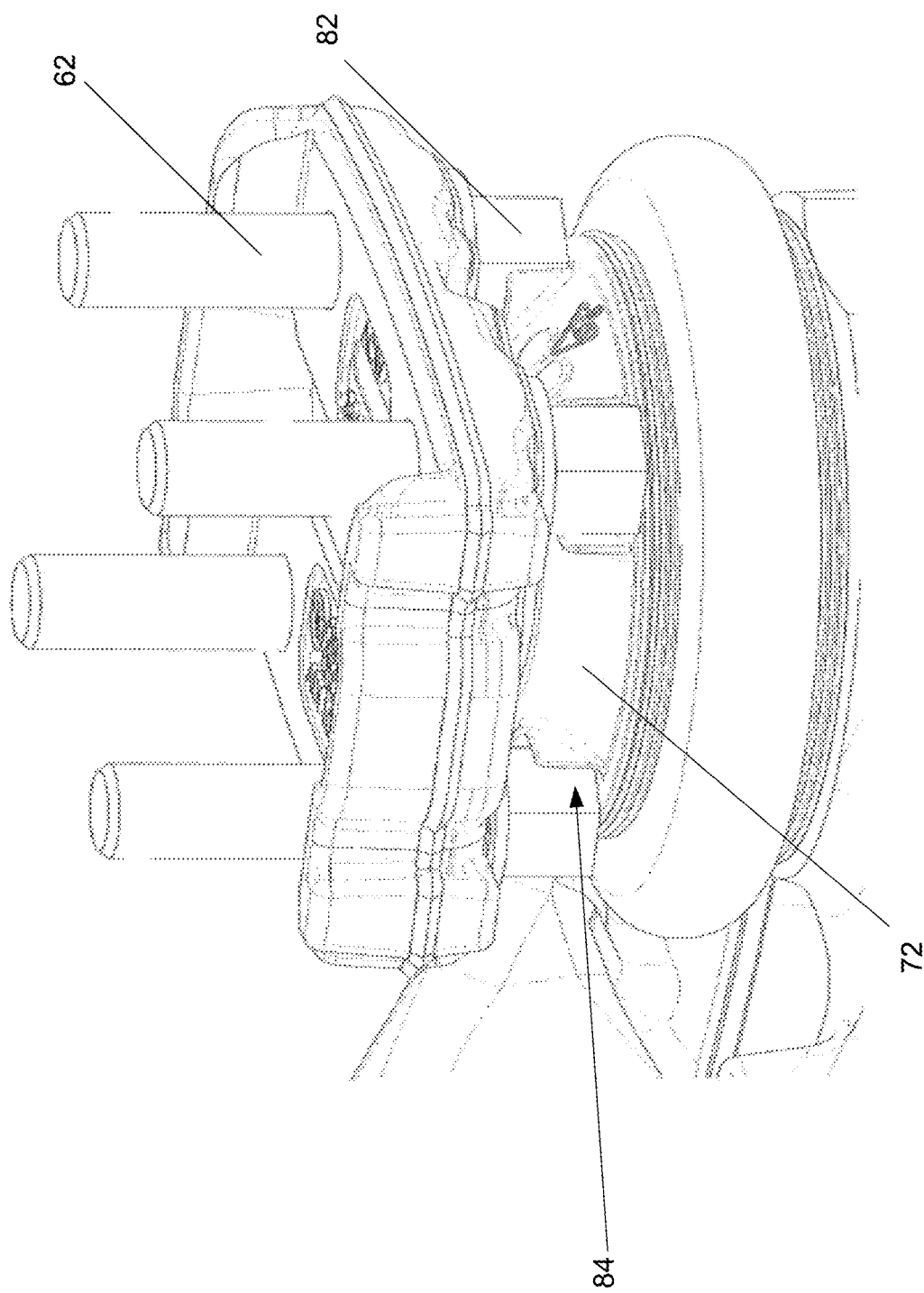
FIG. 7 is a schematic diagram that illustrates, in fragmentary, isometric view, the kingpin bearing assembly of FIG. 6 upside down.
Figure 8:
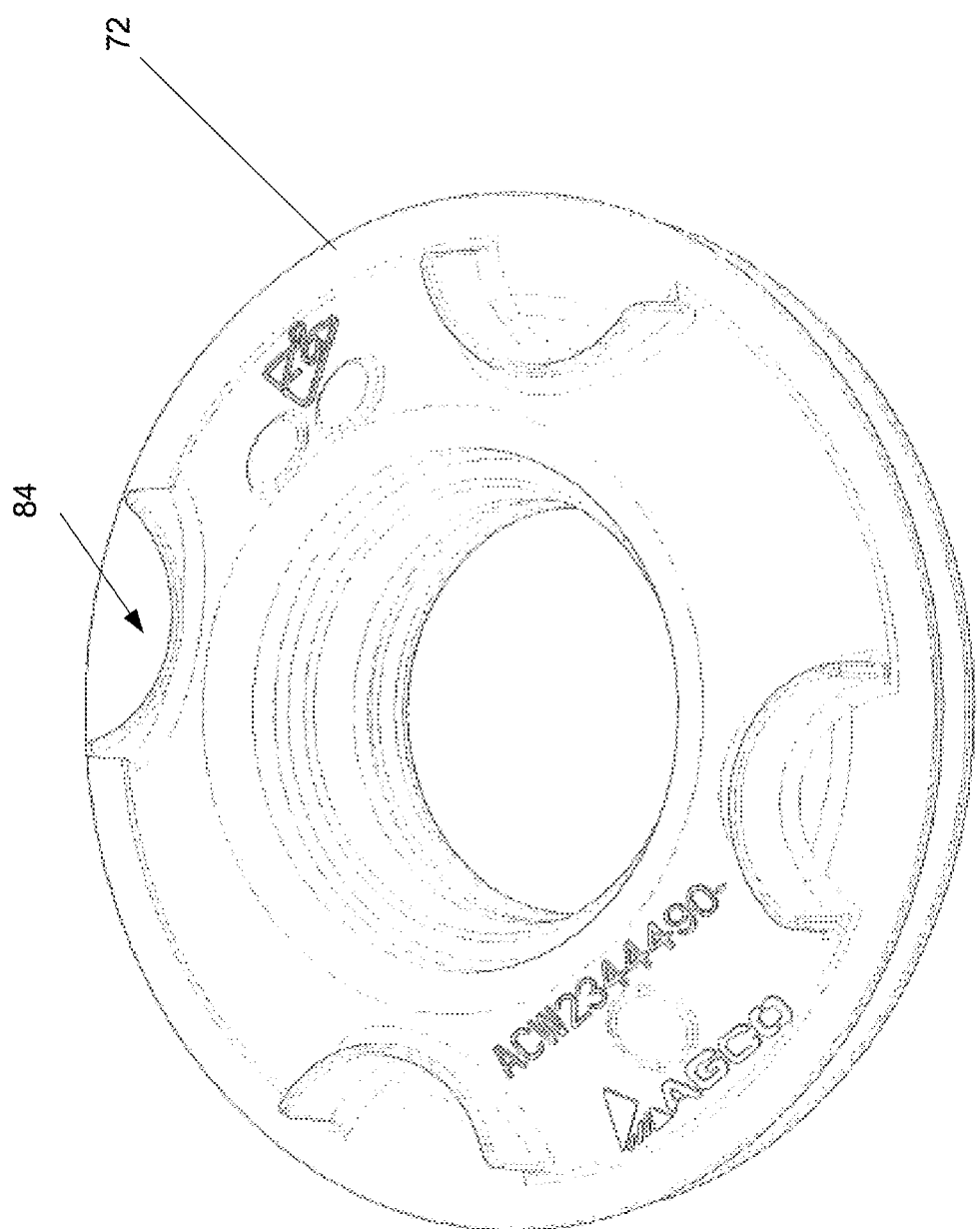
FIG. 8 is a schematic diagram that illustrates, in top isometric view, an embodiment of a cover of the kingpin bearing assembly of FIG. 7.

The cover 72 also provides a dual function that includes a rotation-enabling and sealing/locking function. With continued reference to FIG. 6, attention is directed to FIGS. 7-8, which show the cover 72 comprising recesses (e.g., four (4)) 84 (best shown in FIG. 8) of a semi-circular or arcuate shape when viewed in plan view. The recesses 84 receive each respective bolt head 82 of the bolts 62 that couple to the stub axle 52, the recesses 84 and the bolt heads 82 comprising a frictional fit in locking fashion. Digressing briefly, the rotation and sealing/locking function cause a reaction force. Normally, the friction of the O-ring 74 withstands this reaction force. However, the interface between the recesses 84 and the respective bolt heads 82 provide a back-up to the O-ring function. In other words, if the friction function of the O-ring 74 fails, the cover 72 maintains the resistance to rotation (e.g., a locking feature). The cover 72 has a groove 85 that receives one end (lower end) of the rubber bellow 68, enabling the rubber bellow 68 to rotate as required by the steering controls 54. That is, through the mechanisms of the steering controls 54, the steering cylinder 58 (e.g., FIG. 2B) pushes or pulls the stub axle 52, which rotates the stub axle 52. The rotation is permitted in the groove 85. In one embodiment, the cover 72 is comprised of a plastic material.

Figure 9:
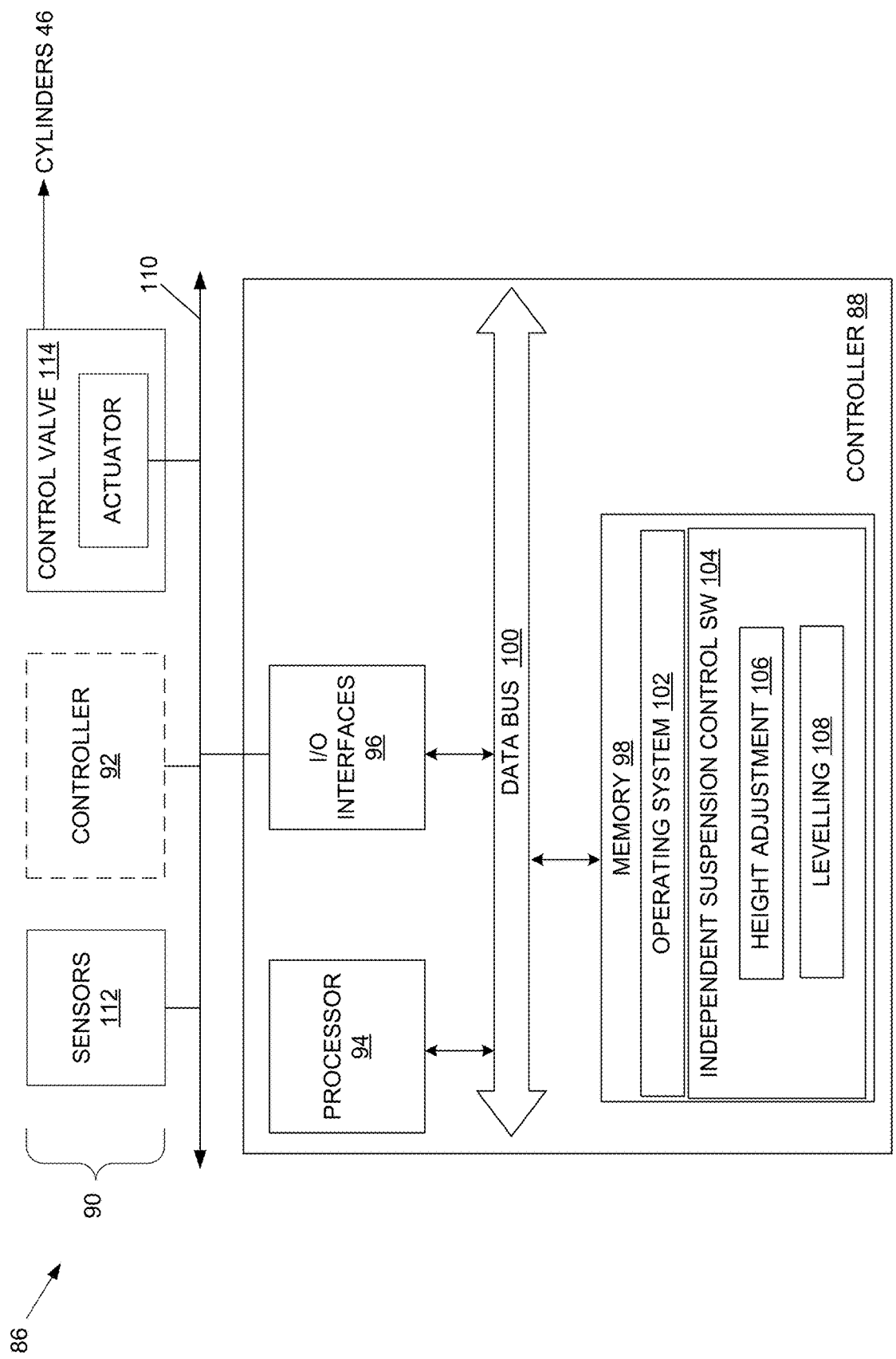
FIG. 9 is a block diagram that illustrates an embodiment of an example control system for controlling the independent suspension.

Having described certain embodiments of an independent suspension system 60 and the kingpin bearing assembly 44, and with continued reference to FIGS. 1-9, attention is directed to FIG. 9, which illustrates an embodiment of an example control system 86 for controlling the independent suspension system 60. It should be appreciated by one having ordinary skill in the art, in the context of the present disclosure, that the control system 86 depicted in FIG. 9 is illustrative of one example, and that in some embodiments, fewer or additional components may be used. The control system 86 comprises a controller 88 (e.g., electronic control unit or ECU), the controller 88 communicatively coupled to a sub-system 90 that may include controls under electronic, electromagnetic, or fluidic control to enable various functionality enabled through the independent suspension system 60. Though emphasis in this disclosure is on the use of a single controller 88, in some embodiments, functionality of the control system 86 may be achieved through the use of plural controllers operating under distributed, local, or remote control according to a peer-to-peer or master-slave control strategy. For instance, controller 92 may reside in a towing vehicle that is towing the pull-type machine 10, the controller 92 in communication and cooperation with the controller 88 to implement the various functionality of the independent suspension system 60. One having ordinary skill in the art should appreciate in the context of the present disclosure that the example controller 88 is merely illustrative, and that some embodiments of the controller 88 may comprise fewer or additional components, and/or some of the functionality associated with the various components depicted in FIG. 9 may be combined, or further distributed among additional modules, in some embodiments. In some embodiments, functionality of modules described herein may be implemented as software, hardware, or a combination of software and hardware. In some embodiments, functionality of the controller 88 may be implemented according to other types of devices, including a programmable logic controller (PLC), FPGA device, ASIC device, among other devices. It should be appreciated that certain well-known components of computer devices are omitted here to avoid obfuscating relevant features of the controller 88.

In one embodiment, the controller 88 comprises one or more processors, such as processor 94, input/output (I/O) interface(s) 96, and memory 98, all coupled to one or more data busses, such as data bus 100. The memory 98 may include any one or a combination of volatile memory elements (e.g., random access memory (RAM, such as DRAM, SRAM, SDRAM, etc.)) and nonvolatile memory elements (e.g., ROM, Flash, solid state, EPROM, EEPROM, etc.). The memory 98 may store a native operating system, one or more native applications, emulation systems, or emulated applications for any of a variety of operating systems and/or emulated hardware platforms, emulated operating systems, etc. In the embodiment depicted in FIG. 9, the memory 98 comprises an operating system 102 and independent suspension control software (SW) 104. In one embodiment, independent suspension control software 104 comprises height adjust software (height adjust) 106 and levelling software (levelling) 108. It should be appreciated by one having ordinary skill in the art that in some embodiments, additional or fewer software modules (e.g., combined functionality) may be employed in the memory 98 or additional memory. In some embodiments, a separate storage device may be coupled to the data bus 100, such as a persistent memory (e.g., optical, magnetic, and/or semiconductor memory and associated drives).

Referring now to the independent suspension control software 104, the height adjustment software (e.g., module) 106 comprises executable code (e.g., instructions) that, when executed by the processor 94, enables the independent suspension system 60 to adjust the height of the pull-type machine 10. For instance, the height adjustment software 106 may signal the control valve 114 to actuate, which in turn causes the cylinders 46 to actuate, the cylinder (rod) extending out in a manner that increases the distance between the chassis 32 and the lower wishbone members 34C and 34D. This motion by the cylinders 46 relative to the chassis 32 and the lower wishbone members 34C and 34D results in a change in height of pull-type machine 10. The motion of the cylinders 46 are of the same or different magnitude and same direction, the motion achieved concurrently or in sequential fashion (e.g., toggling motion from side to side, such as an incremental step rise on the left side, followed by the same step rise on the right side, repeatedly). The height adjustment feature enables not only an increased range of riding heights, but also may enable an increase in capabilities for the working system supported by the chassis 32. For instance, for the sprayer system 14, the height adjustment translates to adjustments in the spray height (e.g., the distance of the nozzles to the crops) and/or adjustments to the boom height to create a larger boom height range. Further, such adjustments enable further flexibility depending on product dispensing requirements (e.g., for different height crops).

With regard to the levelling software 108, the levelling software 108 comprises executable code (e.g., instructions) that, when executed by the processor 94, enables a levelling function, whether at rest (e.g., stationary) or while the pull-type machine 10 is in motion. For instance, during loading, particularly of fluid product (e.g., chemicals), accuracy in quantity measurement is important (e.g., when loading chemicals into the chemical educator 18). If the tires 28 are at a different elevation, loading of the chemicals may be difficult and/or the determination of the amount of chemicals may be inaccurate. The levelling software 108 actuates the control valve 114, which in turn actuates the cylinders 46 such that motion and/or control of one of the cylinders 46 (e.g., a left cylinder) may be independent of the motion and/or control of the other cylinder 46 (e.g., the right cylinder). For instance, if the left tire 28 is at a lower elevation than the right tire 28, the levelling software 108 may receive a signal from the sensors 112 that indicate this difference in elevation, which prompts the cylinder 46 for the left tire to actuate to extend the height on the left side to equal that on the right (or signal the cylinder 46 for the right tire to retract to equalize the heights). The levelling software 108 may receive feedback of the cylinder stroke (e.g., based on an integrated position sensor) to facilitate the proper levelling adjustment. In some embodiments, both cylinders 46 may be actuated for the levelling adjustment in a dual counter-type correction to facilitate levelling to the same wheel height or approximately the same (e.g., to mitigate the effect of the unevenness where it is impossible or difficult to achieve an equal height). Though the levelling has been described above during a time that the pull-type machine 10 is stationary, in some embodiments, the levelling software 108 may achieve levelling while in motion. For instance, when the pull-type machine 10 is being pulled across uneven or undulating terrain, the levelling software 108 may actuate the cylinders 46 (e.g., independently) to level during driving (including product dispensing) operations, such as to avoid the potential for roll-overs (e.g., where one of the tires is high enough relative to the other tire to risk a roll-over event). Or, the levelling software 108 may make an adjustment in the levelling when the tires 28 are at a different elevation to ensure that the distance between the spray nozzles along the boom 24 is fairly consistent across the boom. Note that the these adjustments are described by the control system 86 performing active control (e.g., based on sensor feedback), though it should be appreciated by one having ordinary skill in the art in the context of the present disclosure that certain embodiments of the independent suspension system 60 provide benefits that are inherent to suspended axle designs. For instance, rocky or otherwise rough terrain may lead to inconsistency in the spraying of product along the field. Since the left side of the pull-type machine 10 has a suspended suspension that is independent of the right side, events such as the right-side tire 28 dipping into a hole results in less effect on the left side tire 28 due to the independence and the absorption by the right side of the independent suspension system 60 of the event, resulting in more stable chassis movements and/or rotations and hence improved chassis stability. The less movements and/or rotations the chassis has to take in, the more accurate the application will be.

The processor 94 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 88.

The I/O interfaces 96 provide one or more interfaces to a network comprising a communication medium 110, which may be a wired medium (e.g., controller area network (CAN) bus) as depicted in FIG. 10, a wireless medium (e.g., Bluetooth channel(s)), or a combination of wired and wireless mediums or media. In other words, the I/O interfaces 96 may comprise any number of interfaces for the input and output of signals (e.g., analog or digital data) for conveyance over one or more communication mediums. In the depicted embodiment, the sub-system 90 comprises one or more components that are in communication with the controller 88 via the communication medium 110, including one or more sensors 112, the controller 92, and/or one or more control valves, including control valve 114. The sensors 112 may include an inclinometer and/or angle sensor to enable a determination of whether the pull-type machine 10 is in a potential roll-over position or has different elevations for the tires 28 (e.g., left or right side of a different height). In some embodiments, the sensors 112 may include a position sensor that enables a determination of stroke distance or change in stroke of the cylinders 46. In some embodiments, the position sensor 112 may be integrated with the one or more of the cylinders 46. The control valve 114 comprises an actuator (e.g., solenoid) that enables actuation of the control valve (e.g., actuation of a spool or poppet) that in turn results in a change of fluid flow through the ports 48 of the cylinder 46. The control valve(s) may be located in a manifold that is in fluid communication with the cylinders 46. Communication between the sub-system 90 is achieved via the communications medium 110 (e.g., via ISOBUS, such as a controller area network (CAN)) and the I/O interfaces 96. In some embodiments, additional components may be coupled to the medium 110, including other sensors, other controllers, other actuators, and/or telephony/radio components (e.g., cellular and/or radio frequency (RF) modem), the latter enabling communications with other networks, systems or devices. In some embodiments, the sub-system 90 may include a user interface. Note that in some embodiments, the manner of connections among two or more components may be varied (e.g., with or without intervening components). These and/or other variations are contemplated to be within the scope of the disclosure as would be appreciated by one having ordinary skill in the art.

The independent suspension control software 104, including the height adjustment software 106 and the levelling software 108, comprise executable code/instructions that, when executed by the processor 94, achieve the aforementioned functionality (e.g., height adjustment, levelling). Execution of the levelling software 108 and the height adjustment software 106 and the levelling software 108 is implemented by the processor 94 under the management and/or control of the operating system 102. In some embodiments, functionality of the software 102-106 may be implemented as hardware (e.g., digital logic gates), or as a combination of hardware and software.

When certain embodiments of the controller 88 are implemented at least in part with software (including firmware), as depicted in FIG. 9, it should be noted that the software can be stored on a variety of non-transitory computer-readable storage medium for use by, or in connection with, a variety of computer-related systems or methods. In the context of this document, a computer-readable storage medium may comprise an electronic, magnetic, optical, or other physical device or apparatus that may contain or store a computer program (e.g., executable code or instructions) for use by or in connection with a computer-related system or method. The software may be embedded in a variety of computer-readable storage mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 88 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

The invention claimed is:

1. An apparatus, comprising:
a housing;
a spherical bearing disposed within the housing;
a shaft disposed in part beneath the housing and penetrating a portion of the spherical bearing;
a bellow circumscribing a lower portion of the housing and providing an interface between the spherical bearing and the shaft; and
a cover adjacent a lower end of the bellow and having a circumferential groove configured to enable rotational movement of the bellow, the cover extending to and circumferentially surrounding a portion of the shaft to seal the shaft, the cover comprising a plurality of semi-circular shaped recesses extending radially inward from an outer circumference of the cover, the plurality of semi-circular shaped recesses being spaced apart from each other along the outer circumference of the cover.

2. The apparatus of claim 1, wherein the spherical bearing enables angular rotation about a central point in two orthogonal directions.

3. The apparatus of claim 1, wherein the spherical bearing comprises a dry bearing.

4. The apparatus of claim 1, wherein the bellow is configured to absorb cardanic movement of the spherical bearing while enabling conveyance of rotary steering movement.

5. The apparatus of claim 4, wherein the bellow comprises an elastomeric material.

6. The apparatus of claim 5, wherein the elastomeric material is coated with a low friction material.

7. The apparatus of claim 1, further comprising a plurality of bolts, wherein each of the plurality of semi-circular shaped recesses is configured to receive a respective bolt of the plurality of bolts, and wherein the plurality of bolts are configured with the plurality of semi-circular shaped recesses to prevent rotational movement of the cover.

8. The apparatus of claim 1, wherein the cover comprises a plastic material.

9. The apparatus of claim 1, wherein the cover constrains rotational movement of the bellow to the groove.

10. The apparatus of claim 1, further comprising an O-ring circumscribing the shaft, the O-ring disposed between the shaft and the cover.

11. The apparatus of claim 10, further comprising a bolt disposed centrally through a recess of the shaft, wherein responsive to deformation of the O-ring via a tightening of the bolt, the O-ring is configured to seal the shaft according to a first of plural O-ring functions.

12. The apparatus of claim 10, further comprising a bolt disposed centrally through a recess of the shaft, wherein responsive to deformation of the O-ring via a tightening of the bolt, the O-ring is configured to provide a friction connection between the shaft and the cover according to a second of plural O-ring functions.

13. The apparatus of claim 1, further comprising a clamping ring circumscribing an upper portion and lower portion of the bellow.

14. The apparatus of claim 13, wherein the upper portion comprises a larger diameter than the lower portion, wherein the clamping ring is configured to clamp the upper portion and support the lower portion.

15. The apparatus of claim 1, wherein the spherical bearing comprises a lubricated bearing.

\* \* \* \* \*